United States Patent [19]

Vogel

[11] Patent Number: 4,769,825
[45] Date of Patent: Sep. 6, 1988

[54] COMMUNICATIONS TRANSMISSION SYSTEM FOR ELECTROMAGNETIC WAVES

[75] Inventor: Klaus Vogel, Geretsried Gelting, Fed. Rep. of Germany

[73] Assignee: Siemens Aktiengesellschaft, Berlin and Munich, Fed. Rep. of Germany

[21] Appl. No.: 906,210

[22] Filed: Sep. 12, 1986

[30] Foreign Application Priority Data

Sep. 17, 1985 [DE] Fed. Rep. of Germany ....... 3533156

[51] Int. Cl.$^4$ ............................................. H04B 7/08
[52] U.S. Cl. ....................................... 375/40; 371/68; 375/58; 375/100; 455/69; 455/138
[58] Field of Search .................. 455/8, 10, 52, 69, 116, 455/137, 138, 140, 343; 375/38, 40, 100, 58; 371/8, 68

[56] References Cited

U.S. PATENT DOCUMENTS

| | | | |
|---|---|---|---|
| 3,151,295 | 9/1964 | Haviland | 455/69 |
| 3,315,164 | 4/1967 | Ferguson, Jr. et al. | 455/116 |
| 3,390,335 | 6/1968 | Miyagi | 455/116 |
| 4,004,224 | 1/1977 | Arens et al. | 455/10 |
| 4,194,153 | 3/1980 | Masaki et al. | 455/343 |

OTHER PUBLICATIONS

French Publication, Communication & Transmission No. 316, 6(1984), Sep., No. 3, Entitled Systems Hertziens 140 MBIT/S A 4 ET 6 GHZ STN 65-140-STN 36-140.

Primary Examiner—Benedict V. Safourek
Attorney, Agent, or Firm—Hill, Van Santen, Steadman & Simpson

[57] ABSTRACT

A communication transmission system for electromagnetic waves comprising a transmitter, transmitting and receiving antenna with a radio link hop therebetween and a receiver having an associated diversity receiver. When there is no access to energy supply, network energy is supplied from batteries, solar systems and other power supplies which have limited power and are expensive. So as to provide energy saving operation of a system, a digital system is created and the invention provides a fade detector in the receiver for fast recognition of fading and which produces signals corresponding to the weighted switching thresholds that are derived for the connection of the diversity receiver which had previously been disconnected so as to reduce power consumption and for setting by reducing or increasing the transmission power or for the IF through connecting by way of a plurality of radio link hops or for the compensation or cancellation thereof.

6 Claims, 3 Drawing Sheets

COMMUNICATIONS TRANSMISSION SYSTEM FOR ELECTROMAGNETIC WAVES

BACKGROUND OF THE INVENTION

1. Field of the Invention

The invention relates in general to communication transmission systems for electromagnetic waves comprising a transmitter in which the signal to be transmitted is modulated onto a carrier and to the transmission and reception antennas with a radio link hop lying between them and to a receiver which includes an allocated diversity receiver in which the received signal is converted into an IF level and is demodulated.

2. Description of the Prior Art

On radio links which do not have access to energy supply networks, radio systems are supplied by way, of example, by solar systems, wind generators or by diesel generators. High acquisition and operating costs of such systems require that the lowest possible power consumption of the radio apparatus occur. For analog FM systems and digital systems up to 34M bits per second an adequately low power consumption can be achieved with standard systems concepts. For solar systems, for example, power consumption can be less than 300 watts for two way 1+1 connections without significant departure from the CCIR quality demands for transmission systems. Fast digital systems as, for example, 140M bits per second present a number of problems and these require adaptive base band equalizers and space diversity because of their sensitivity to fading and also are dependent on fast logic which require high power consumption.

SUMMARY OF THE INVENTION

It is an object of the present invention to provide a solution for communication transmission systems which operate on auxiliary power and from which fast digital systems as well as low capacity digital systems can be operated in energy saving manner.

It is a feature of the present invention to provide a detector for fast recognition of fade phenomena for example, flat fade and IF amplitude distortion which are provided at the receiver and switching thresholds are weighted according to the fade phenomena derived from the signals thereof and supplying switching criteria for the interruption free connection or disconnection of the diversity receiver as is required, from the momentary fading situation for reducing fade distortions.

As an advantageous development of the invention, the switching thresholds for the transmitter power adjustments are derived from the signals of the fade detector and are derived such that the previously reduced transmission power of the radio link hop is boosted to normal transmission power for defined fading events and switching thresholds for IF through connection by way of a plurality of radio link hops and their compensation or cancellation are obtained from the signals of the fade detector. These signals are derived from the signals of the fade detector such that the regenerating and for example, adaptively fading equalizing modem previously disconnected so as to reduce operating power are bridged in the IF range by a branching at the input and an IF switch at the output are again connected so as to prevent possible increasing distortion during fading on the basis of the full equalizing and regenerating effect of the modem.

The invention results from realization that no fade exists during the majority of the transmission time on the radio link hops. The devices are operating at levels greater than necessary during this time. In the invention, the power consumption of the system can be greatly reduced either individually or combined in various ways in fade free time without deteriorating the quality of the transmission. On the basis of early recognition of the critical fade in a time before the appearance of the first bit errors depending on the serious fade, power reduction can be eliminated and adequate power to eliminate the bit errors can be applied. The invention is also capable of allowing errors to be avoided according to different weighted threshold criteria without errors building up during switchover.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
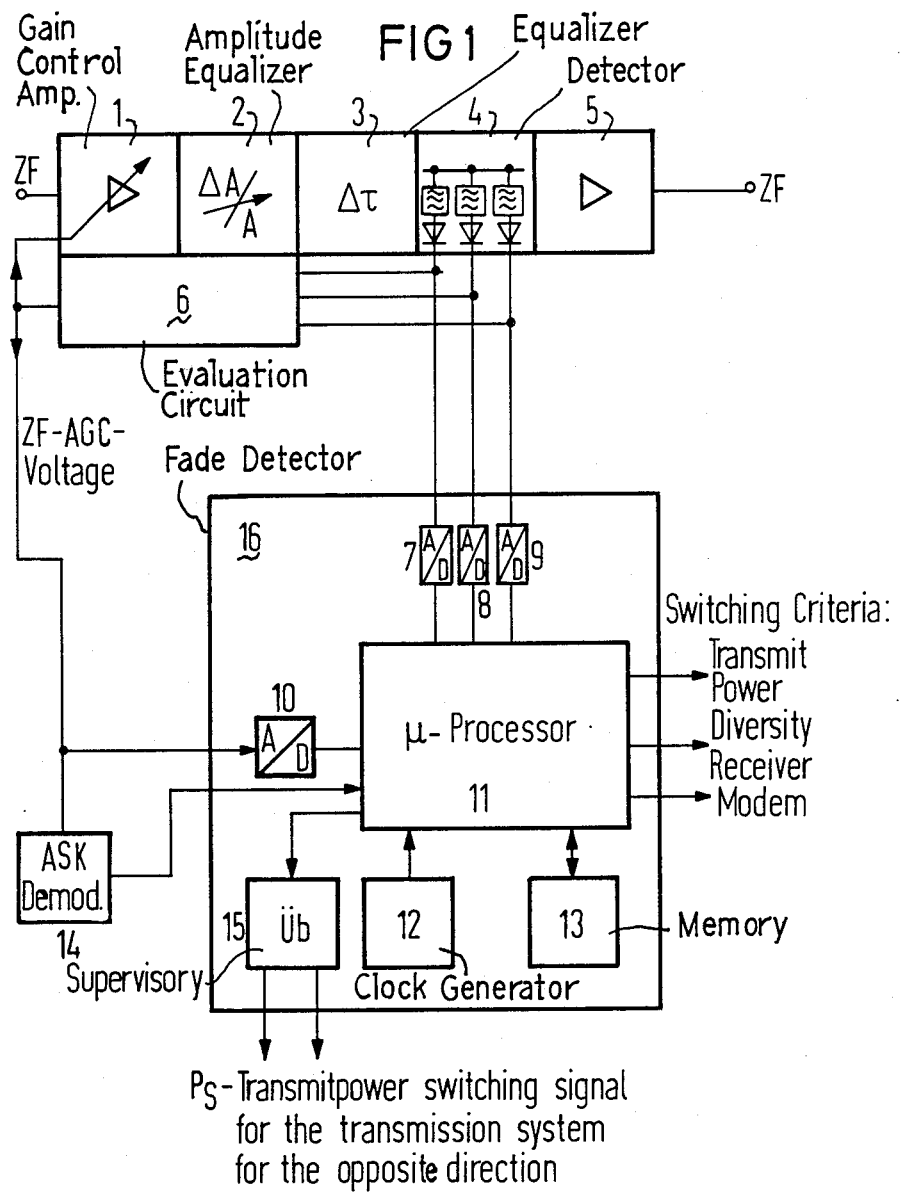
FIG. 1 is a block circuit diagram of the receiver portion for fade recognition and deriving the control criteria.

FIG. 1 illustrates the IF portion of the receiver of the communication transmission system and includes the devices for the recognition of fading, for example, in the IF signal. The IF portion includes an IF gain control amplifier 1 which supplies an output to an IF amplitude equalizer 2. A group delay equalizer 3 receives the output of the amplitude equalizer 2 and supplies an output to a detector 4. An output amplifier 5 receives the output of the detector 4 and supplies the IF signal to an IF output terminal. The amplitude equalizer 2 is controlled by detector signals from an evaluation circuit 6 which receives the detected signals from the detector.

The detector 4 detects signal amplitude slope distortions and quadratic distortions and so on which have their origin in fading activities. These signals can be simultaneously employed for the recognition of fade phenomena. In the system, the detector 4 normally controls the IF amplitude equalizer 2 through the evaluation circuit 6 such that amplitude slope distortions, parabolic distortions, cubic distortions and under given conditions distortions of the IF amplitude frequency response of a higher order caused by radio link hop echoes are equalized by appropriate regulating units in the amplitude equalizer 2. The detector signals also simultaneously control the IF controlled gain amplifier 1 for compensating of flat fade caused by the radio link hop.

The IF AGC signal of the evaluator circuit 6 for the IF control gain amplifier 1 which for example, indicates the radio attenuation for example, in dB linear fashion and the signals of the detector 4 which measure the signal power at a plurality of frequencies distributed over the signal spectrum are supplied by way of analog to digital converters 10 and/or 7, 8 and 9 and more if necessary to a microprocessor 11 which receives a clock input from a clock generator 12 and receives its work program and data from a memory 13. Also the microprocessor 11 is supplied with the signals of a ASK demodulator 14 which is also connected to the evaluator circuit 6. The unit composed of the microprocessor 11, the analog to digital converters 7, 8, 9 and 10, the clock generator 12, the memory 13 and a supervisory 15 means which is connected to the microprocessor 11 is identified below as a fade detector 16. According to the work program prescribed for the processor 11 switch thresholds for the transmission power, diversity receiver and MODEM are derived by corresponding weighting of the data such that, for example, the speed of the changes is coweighted. Switchover signals are produced at the output.

The following example will show the significance of the consideration of the speed of the changes. Given, for example, particularly fast changes in the automatic gain control AGC and sloped amplitude positions, the engagement of the modem and diversity receivers must be started at an especially early time so as to avoid errors due to the fast fade occurrence. The reason for this is that the switchover requires time and the fade distortions must not deteriorate such during this time that bit errors accumulate before the connection of the modem and diversity receiver has been carried out. For this case, for example, 2 dB amplitude slope distortion would be selected as the switchover threshold. Given slow fade events, the threshold by comparison could be shifted by the processor to 6 dB amplitude slope distortion for the diversity receiver which would still be error free since the adaptive modem—switched at 2 dB threshold would cancel the distortion leveled by the adaptive IF amplitude equalizer 2. Lower station power consumption and fewer switching actions are the result.

Figure 2:
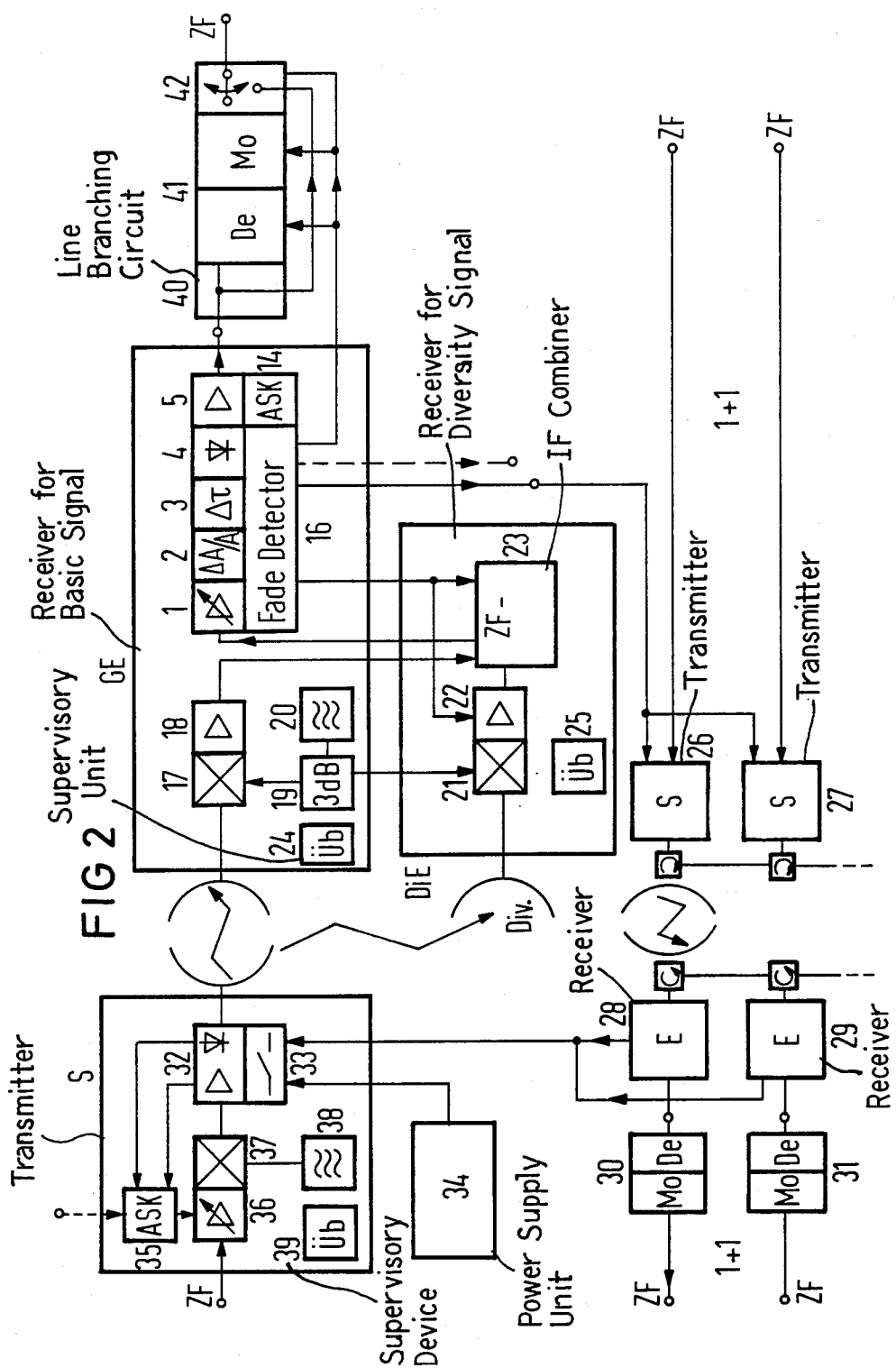
FIG. 2 is a block circuit diagram illustrating the transmitter and receiver devices of a communication transmission system with fade control according to the invention and FIG. 3 is a detailed view of the I.F. combiner.

FIG. 2 shows the transmitter and receiver devices of a communication transmission system including the control and monitoring devices for fade phenomena. A receiver GE for the basic signal and a receiver DiE for the diversity signal are provided at the receiver side as shown. Both receivers are connected to antennas. The IF portion of the basic receiver GE comprising the fade detector 1, 2, 3, 4, 5, 14, 16 as well as the regulating and evaluating devices for the switching thresholds essentially correspond to the circuit portion illustrated in FIG. 1. The receiver includes a receiving mixer 17 which receives the output of the antenna and also receives the output of an oscillator 20 which is supplied through a 3 dB coupler 19. The oscillator 20 also supplies a signal through this 3 dB coupler 19 to a receiving mixer 21 in the diversity receiver DiE branch. The output signals of the receiving mixers 17 and 21 in the basic receiver GE and the diversity receiver DiE are respectively supplied through amplifiers 18 and 22 to IF combiner 23 which has its output connected to the input of the IF controlled gain amplifier 1 in the IF portion of the basic receiver GE. Supervisory devices in the basic receiver GE and diversity receiver DiE are indicated by reference numerals 24 and 25. The control signals or respectively the switchover signals generated by the fade detector 16 are conducted through control lines to the corresponding elements. A first control line leads to the IF combiner 23 and to the amplifier 22 in the diversity receiver DiE. Disconnection of the diverisity receiver DiE occurs with this control and this is only required in the fade case for signal improvement distortion.

The control signal generated by the fade detector 16 for decreasing and increasing the transmission power is transmitted to the transmit side in the opposite direction and is transmitted by way of transmitters 26 and 27 of the 1+1 protected transmission circuit shown in the exemplary embodiment. The associated receivers 28 and 29 of the 1+1 backup circuit receives the control signals through appropriate antenna from the transmitters 26 and 27 and supply them to a control signal receiver 33 for the switching action of the transmit power level of the transmitter amplifier 32 of the transmitter S. The receiver 33 is also connected at the same time to a power supply unit 34 and a loss free control of the operating points of the transmitter amplifier is initiated in 33. The transmitter amplifier 32 receives the RF signal through a controllable IF pre-amplifier 36 which supplies an output to a mixer 37 which supplies an RF input signal to the transmitter amplifier 32. The mixer 37 receives an input from an oscillator 38 and an ASK modulator 35 supplies an input to the controllable preamplifier 36 and receives outputs of the transmission amplifier 32. A supervisory device 39 monitors functions in the transmitter S.

The decreasing or increasing of the transmission power is thus to be monitored at the receiver side. This occurs in a simple way on the basis of a low frequency as, for example, 500 Hz through 1 KHz with ASK modulation of the transmitted power by means of the ASK modulator 35 such that the modulation is impressed on the transmitted power in the low frequency gain control loop of the IF pre-amplifier 36. The ASK modulation is demodulated on the receiver side by the fast gain control loop of the IF AGC amplifier 1 of FIG. 1 and detected and evaluated in the demodulator device 14 (FIG. 1) and it is canceled out of the intermediate frequency and thus eliminated. This prevents faulty forwarding the ASK modulation to the following eventually IF through connected radio link hops.

For signal protection purposes the transmit power switching signal from 16 is transmitted in parallel on the transceivers 26/28 and 27/29.

The execution of the boost of the transmitted power can be acknowledged at the receiver side for supervisory purposes. The accomplished action of boosting the transmit power of 32 is transmitted back to the receive side with ASK modulation 35 and demodulated in the receive side 16. A failure of the acknowledgment to arrive at the receiver can lead to a signal to the supervisory unit 24 and, thus, indicate a fault.

The receiver portion of the basic receiver GE supplies an output as illustrated in FIG. 2 to a line branching circuit 40 which supplies an output to a demodulator/modulator 41 which in turn supplies an output to a switch 42. With corresponding control signals of the fade detector 16 the modem 41 can be bypassed and in other words the IF signal from GE can be through connected to the next transmitter or can remain engaged on the basis of switchable thresholds identified in the microprocessor 11 (FIG. 1). An IF through connection can occur over a plurality of radio link hops. To reduce system power consumption the modem is switched off during the IF through connection phase.

Figure 3:
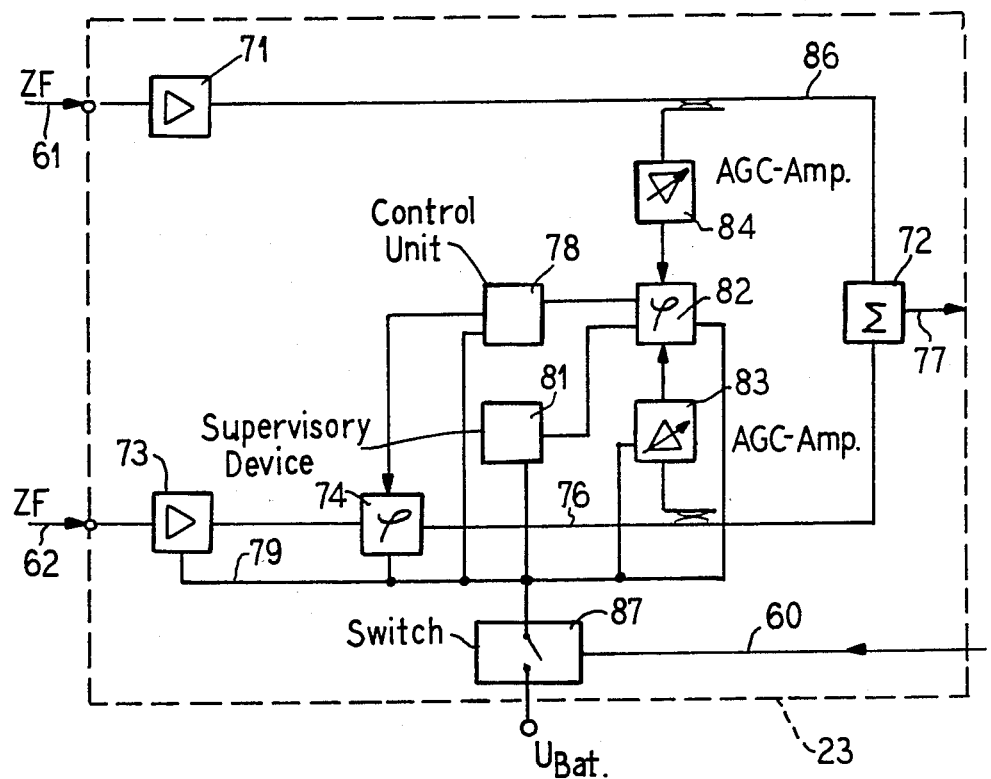

FIG. 3 illustrates the I.F. combiner 23 shown in FIG. 2 which receives an input on line 61 from the receiver GE from the output of the amplifier 18 and an input on line 62 from the output of amplifier 22 of the diversity receiver. Line 61 is connected to an amplifier 71 which is connected to a first input of an adding device 72. The line 62 is connected to an amplifier 73 which suplies an output to a phase controller 74 which supplies an output to line 76 which is connected as a second input to the adder 72. The output of the adder is supplied to line 77 which is connected as the input to the amplifier 1 in the receiver GE. A control unit 78 supplies an input to the phase controller 74 to vary the phase shift and the phase controller 74 receives an input on line 79 which is also supplied to the amplifier 73 and to the control unit 78. A supervisory device 81 receives an input from line 79 and supplies an input to a phase controller 82 which also receives an input from a control unit 78 and from an automatic gain control amplifier 83 which also receives an input from line 79. The phase controller 82 supplies an output to line 79. The automatic gain control amplifier 84 is coupled to line 86 and the automatic gain control amplifier 83 is coupled to line 76. The fade detector 16 supplies an input on line 60 to a switch 87 which receives an input from a voltage source $U_{Bat}$. Also, incorporated by reference is U.S. Pat. No. 4,386,435 which discloses a known circuit showing an I.F. combiner. In the known circuit of U.S. Pat. No. 4,386,435, the I.F. signals of two receving branches including a basic signal and the diversity signal are supplied to a adding device either directly or through a phase shifter. Signal components are coupled from both signal paths and the signal components are supplied by way of amplifiers to a phase detector which supplies a control signal for a phase shifter in one signal path. A supervisory device is also associated with the phase detector. The supply voltage $U_{Bat}$ is supplied to the individual elements of the diversity receiver and the I.F. combiner by way of a switch which is driven by an output signal of the fade detector 16.

I claim as my invention:

1. A communication transmission system for electromagnetic waves, comprising a first transmitter at a first location in which the signal to be transmitted is modulated onto a carrier, a first receiver spaced from said transmitter, a transmitting antenna connected to said first transmitter, a receiving antenna connected to said first receiver, a diversity receiver near said first receiver for receiving a diversity signal, a further receiving antenna connected to said diversity receiver, means for converting the received signals in said first receiver and said diversity receiver to IF signals, means for combining said IF signals, a fade detector which receives outputs from said means for combining, for rapid recognition of different fading phenomena as, for example, flat fade and IF amplitude distortions and said fade detector producing a switching signal when fading occurs, a switching means receiving said switching signal and connected to said diversity receiver to reduce power consumption by disconnecting said diversity receiver from the combiner when it is affected by fading.

2. A communication transmission system according to claim 1, including, a second transmitter located near said first receiver and said diversity receiver and connected to receive an output of said fade detector so as to transmit a control signal to said first transmitter, a second receiver mounted near said first transmitter and receiving a signal from said second transmitter, and power control means receiving an output of said second receiver and supplying an output to said first transmitter so as to control its power output.

3. A communication transmission system according to claims 1 or 2 wherein said first receiver includes a modem which is disconnected during fade-free conditions so that said communications transmission system can operate at a low power level.

4. A communication transmision system according to claims 1 or 2 wherein said fade detector includes a microprocessor which evaluates the signals received by said first and said diversity receivers and produces the output switching signal, a clock generator connected to said microprocessor, and a memory which contains data and a program connected to said microprocessor 5. A communication transmission system as claimed in claim 4, in which said fade detector for recognizing fading phenomena consists of a detector for adaptive IF-amplitude distortion correction contained in the IF-section of said first contained in the IF-section of said first receiver, and the output signal of said detector are fed to said micro-processor.

6. A communication transmission system according to claim 2 characterized in that said control signal transmitted to said first transmitter is acknowledged by said first transmitter and transmitted to said first receiver.

* * * * *